United States Patent
Cho et al.

(10) Patent No.: US 9,593,746 B2
(45) Date of Patent: Mar. 14, 2017

(54) PLANETARY GEAR TRAIN OF AUTOMATIC TRANSMISSION FOR VEHICLE

(71) Applicant: Hyundai Motor Company, Seoul (KR)

(72) Inventors: Wonmin Cho, Hwaseong-si (KR); Jae Chang Kook, Hwaseong-si (KR); Myeong Hoon Noh, Seongnam-si (KR); Seongwook Ji, Ansan-si (KR); Kangsoo Seo, Yongin-si (KR); Seong Wook Hwang, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/933,953

(22) Filed: Nov. 5, 2015

(65) Prior Publication Data
US 2016/0356356 A1  Dec. 8, 2016

(30) Foreign Application Priority Data
Jun. 2, 2015 (KR) ........................ 10-2015-0077995

(51) Int. Cl.
*F16H 3/66* (2006.01)

(52) U.S. Cl.
CPC ....... *F16H 3/66* (2013.01); *F16H 2200/0073* (2013.01); *F16H 2200/2012* (2013.01); *F16H 2200/2046* (2013.01)

(58) Field of Classification Search
CPC ............... F16H 3/66; F16H 2200/2046; F16H 2200/2012; F16H 2200/0073
(Continued)

(56) References Cited

U.S. PATENT DOCUMENTS

| 8,968,145 B2 | 3/2015 | Mellet et al. |
| 2016/0146296 A1* | 5/2016 | Cho .......................... F16H 3/66 475/275 |

(Continued)

FOREIGN PATENT DOCUMENTS

| JP | 2009-197927 A | 9/2009 |
| KR | 10-2012-0132022 A | 12/2012 |
| KR | 10-1427977 B1 | 8/2014 |

*Primary Examiner* — Roger Pang
(74) *Attorney, Agent, or Firm* — Morgan, Lewis & Bockius LLP

(57) ABSTRACT

A planetary gear train of an automatic transmission may include: an input shaft; an output gear; a first planetary gear set including first sun gear, first planet carrier, and first ring gear; a second planetary gear set including second sun gear, second planet carrier, and second ring gear; a third planetary gear set including third sun gear, third planet carrier, and third ring gear; a fourth planetary gear set including fourth sun gear, fourth planet carrier, and fourth ring gear; a first rotation shaft including the first sun gear; a second rotation shaft including the first planet carrier, the second ring gear, the third planet carrier, and the fourth ring gear; a third rotation shaft including the first and third ring gears; a fourth rotation shaft including the second sun gear and selectively connected to a transmission housing; a fifth rotation shaft including the second planet carrier, selectively connected to the first rotation shaft and to the third rotation shaft, and directly connected to the input shaft; a sixth rotation shaft including the third sun gear; a seventh rotation shaft including the fourth sun gear, selectively connected to the sixth rotation shaft, and to the transmission housing; and an eighth rotation shaft including the fourth planet carrier, selectively connected to the sixth rotation shaft, and directly connected to the output gear.

9 Claims, 2 Drawing Sheets

(58) Field of Classification Search
USPC .......................................... 475/275–291, 330
See application file for complete search history.

(56) References Cited

U.S. PATENT DOCUMENTS

| | | | |
|---|---|---|---|
| 2016/0169334 A1* | 6/2016 | Cho | ........................ F16H 3/66 475/275 |
| 2016/0169346 A1* | 6/2016 | Cho | ........................ F16H 3/66 475/275 |
| 2016/0169347 A1* | 6/2016 | Cho | ........................ F16H 3/66 475/277 |
| 2016/0258513 A1* | 9/2016 | Cho | ........................ F16H 3/66 |
| 2016/0319914 A1* | 11/2016 | Lee | ........................ F16H 3/66 |

* cited by examiner

FIG. 2

|  | C1 | C2 | C3 | C4 | B1 | B2 |
|---|---|---|---|---|---|---|
| 1ST |  | O |  | O |  | O |
| 2ND |  | O | O |  |  | O |
| 3RD | O | O |  |  |  | O |
| 4TH | O | O | O |  |  |  |
| 5TH | O |  | O |  |  | O |
| 6TH | O |  | O |  | O |  |
| 7TH | O |  |  |  | O | O |
| 8TH | O |  |  | O | O |  |
| 9TH |  |  | O | O | O |  |
| 10TH |  | O |  | O | O |  |
| 11TH |  | O | O |  | O |  |
| REV | O |  |  | O |  | O |

PLANETARY GEAR TRAIN OF AUTOMATIC TRANSMISSION FOR VEHICLE

CROSS-REFERENCE TO RELATED APPLICATION

The present application claims priority to and the benefit of Korean Patent Application No. 10-2015-0077995 filed on Jun. 2, 2015, the entire contents of which is incorporated herein for all purposes by this reference.

BACKGROUND OF THE INVENTION

Field of the Invention

The present invention relates to an automatic transmission for a vehicle. More particularly, the present invention relates to a planetary gear train of an automatic transmission of a vehicle that can improve power delivery performance and reduce fuel consumption by achieving eleven forward speed stages using a minimum number of constituent elements.

Description of Related Art

In recent years, a rise in oil price causes dashing into unlimited competition for enhancing fuel efficiency.

As a result, a research into reduction of weight and the enhancement of the fuel efficiency through down sizing is conducted in the case of an engine and a research for simultaneously securing operability and fuel efficiency competitiveness through multiple speed stages is conducted in the case of an automatic transmission.

However, in the automatic transmission, as the number of speed stages increases, the number of internal components increase, and as a result, mountability, cost, weight, transmission efficiency, and the like may still deteriorate.

Accordingly, development of a planetary gear train which may bring about maximum efficiency with a small number of components may be important in order to increase a fuel efficiency enhancement effect through the multiple speed stages.

In this aspect, in recent years, 8 and 9-speed automatic transmissions tend to be implemented and the research and development of a planetary gear train capable of implementing more speed stages has also been actively conducted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of improving power delivery performance and fuel efficiency by achieving eleven forward speed stages and one reverse speed stage using a driving point positioned at a low engine speed.

A planetary gear train of an automatic transmission for a vehicle according to an exemplary embodiment of the present invention may include: an input shaft receiving torque of an engine; an output gear outputting changed torque; a first planetary gear set including a first sun gear, a first planet carrier, and a first ring gear; a second planetary gear set including a second sun gear, a second planet carrier, and a second ring gear; a third planetary gear set including a third sun gear, a third planet carrier, and a third ring gear; a fourth planetary gear set including a fourth sun gear, a fourth planet carrier, and a fourth ring gear; a first rotation shaft including the first sun gear; a second rotation shaft including the first planet carrier, the second ring gear, the third planet carrier, and the fourth ring gear; a third rotation shaft including the first ring gear and the third ring gear; a fourth rotation shaft including the second sun gear and selectively connected to a transmission housing; a fifth rotation shaft including the second planet carrier, selectively connected to the first rotation shaft, selectively connected to the third rotation shaft, and directly connected to the input shaft; a sixth rotation shaft including the third sun gear; a seventh rotation shaft including the fourth sun gear, selectively connected to the sixth rotation shaft, and selectively connected to the transmission housing; and an eighth rotation shaft including the fourth planet carrier, selectively connected to the sixth rotation shaft, and directly connected to the output gear.

Each of the first, second, third, and fourth planetary gear sets may be a single pinion planetary gear set.

The first, second, third, and fourth planetary gear sets may be disposed sequentially from an engine side.

The planetary gear train may further include: a first clutch disposed between the first rotation shaft and the fifth rotation shaft; a second clutch disposed between the third rotation shaft and the fifth rotation shaft; a third clutch disposed between the sixth rotation shaft and the eighth rotation shaft; a fourth clutch disposed between the sixth rotation shaft and the seventh rotation shaft; a first brake disposed between the fourth rotation shaft and the transmission housing; and a second brake disposed between the seventh rotation shaft and the transmission housing.

A first forward speed stage may be achieved by operation of the second and fourth clutches and the second brake, a second forward speed stage may be achieved by operation of the second and third clutches and the second brake, a third forward speed stage may be achieved by operation of the first and second clutches and the second brake, a fourth forward speed stage may be achieved by operation of the first, second and third clutches, a fifth forward speed stage may be achieved by operation of the first and third clutches and the second brake, a sixth forward speed stage may be achieved by operation of the first and third clutches and the first brake, a seventh forward speed stage may be achieved by operation of the first clutch and the first and second brakes, an eighth forward speed stage may be achieved by operation of the first and fourth clutches and the first brake, a ninth forward speed stage may be achieved by operation of the third and fourth clutches and the first brake, a tenth forward speed stage may be achieved by operation of the second and fourth clutches and the first brake, an eleventh forward speed stage may be achieved by operation of the second and third clutches and the first brake, and a reverse speed stage is achieved by operation of the first and fourth clutches and the second brake.

A planetary gear train of an automatic transmission for a vehicle according to another exemplary embodiment of the present invention may include: an input shaft receiving torque of an engine; an output gear outputting changed torque; a first planetary gear set including a first sun gear, a first planet carrier, and first ring gear; a second planetary gear set including a second sun gear, a second planet carrier, and a second ring gear; a third planetary gear set including a third sun gear, a third planet carrier, and a third ring gear; a fourth planetary gear set including a fourth sun gear, a fourth planet carrier, and a fourth ring gear; a first clutch selectively connecting the first sun gear to the second planet carrier; a second clutch selectively connecting the second planet carrier to the first ring gear; a third clutch selectively connecting the third sun gear to the fourth planet carrier; a fourth clutch selectively connecting the third sun gear to the fourth sun gear; a first brake selectively connecting the second sun gear to the transmission housing; a second brake selectively connecting the fourth sun gear to the transmission housing; wherein the input shaft may be directly connected to the second planet carrier, the output gear may be directly connected to the fourth planet carrier, the first planet carrier may be directly connected to the second ring gear, the third planet carrier, and the fourth ring gear, the first ring gear may be directly connected to the third ring gear.

An exemplary embodiment of the present invention may achieve eleven forward speed stages by combining four planetary gear sets with six friction elements. Therefore, power delivery performance and fuel efficiency may be improved.

Since a speed stage suitable to engine speed can be achieved due to multiple speed stages, silent driving may be improved.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart of friction elements at each speed stage in the planetary gear train according to an exemplary embodiment of the present invention.

Figure 1:
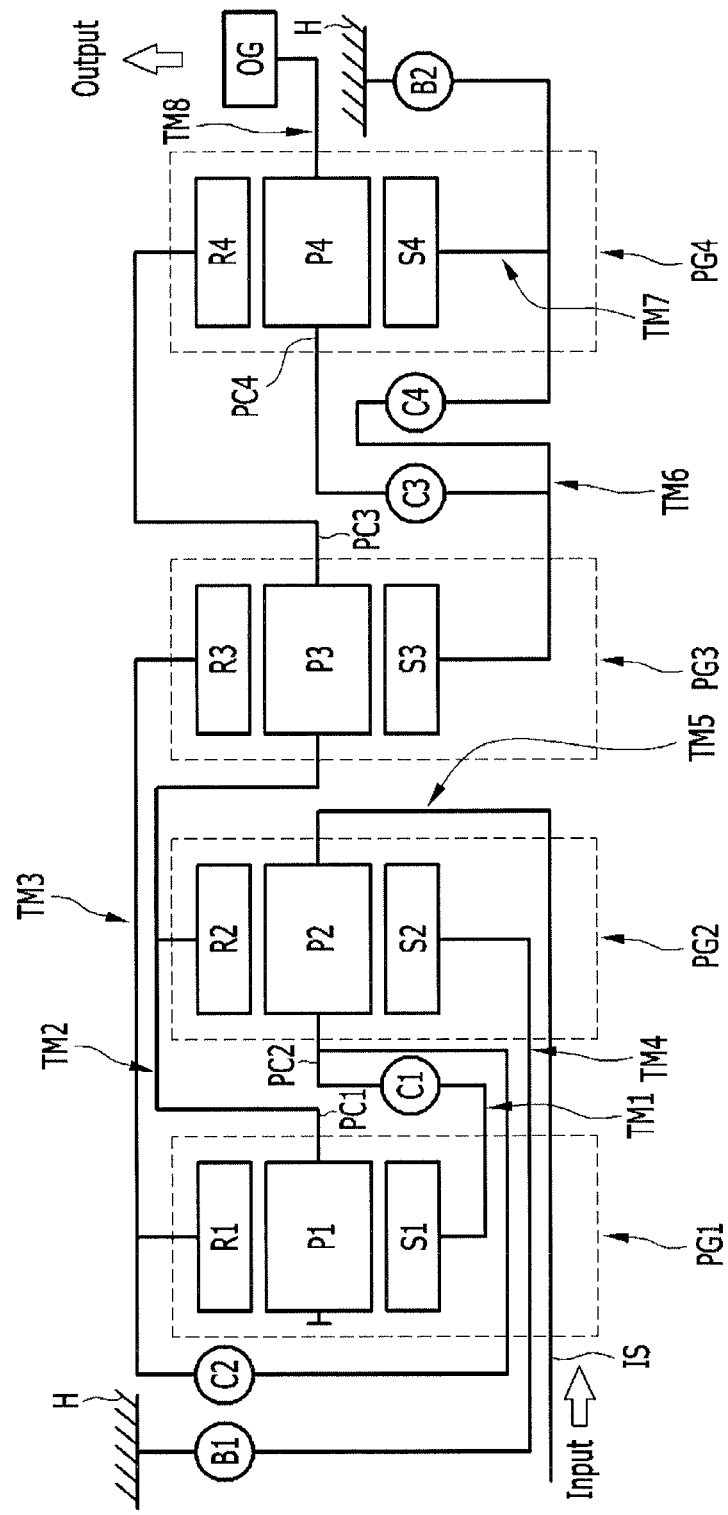
FIG. 1 is a schematic diagram of a planetary gear train according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several FIGS. of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

However, parts which are not related with the description are omitted for clearly describing the exemplary embodiment of the present invention and like reference numerals refer to like or similar elements throughout the specification.

In the following description, dividing names of components into first, second, and the like is to divide the names because the names of the components are the same as each other and an order thereof is not particularly limited.

FIG. 1 is a schematic diagram of a planetary gear train according to an exemplary embodiment of the present invention.

Referring to FIG. 1, a planetary gear train according to an exemplary embodiment of the present invention includes first, second, third, and fourth planetary gear sets PG1, PG2, PG3, and PG4 disposed on the same axis, an input shaft IS, an output shaft OS, eight rotation shafts TM1 to TM8 including at least one of rotation elements of the first, second, third, and fourth planetary gear sets PG1, PG2, PG3, and PG4, six friction elements C1 to C4 and B1 to B2, and a transmission housing H.

As a result, torque input from the input shaft IS is changed by cooperation of the first, second, third, and fourth planetary gear sets PG1, PG2, PG3, and PG4, and the changed torque is output through the output shaft OS.

The planetary gear sets PG1, PG2, PG3, and PG4 are disposed sequentially from an engine side.

The input shaft IS is an input member and power from a crankshaft of an engine is torque-converted through a torque converter to be input into the input shaft IS.

The output gear OG is an output member, and transmits driving torque to a driving wheel through a differential apparatus.

The first planetary gear set PG1 is a single pinion planetary gear set and includes a first sun gear S1, a first planet carrier PC1 rotatably supporting a first pinion P1 that is externally meshed with the first sun gear S1, and a first ring gear R1 that is internally meshed with the first pinion P1 as rotation elements thereof.

The second planetary gear set PG2 is a single pinion planetary gear set and includes a second sun gear S2, a second planet carrier PC2 rotatably supporting a second pinion P2 that is externally meshed with the second sun gear S2, and a second ring gear R2 that is internally meshed with the second pinion P2 as rotation elements thereof.

The third planetary gear set PG3 is a single pinion planetary gear set and includes a third sun gear S3, a third planet carrier PC3 rotatably supporting a third pinion P3 that is externally meshed with the third sun gear S3, and a third ring gear R3 that is internally meshed with the third pinion P3 as rotation elements thereof.

The fourth planetary gear set PG4 is a single pinion planetary gear set and includes a fourth sun gear S4, a fourth planet carrier PC4 rotatably supporting a fourth pinion P4 that is externally meshed with the fourth sun gear S4, and a fourth ring gear R4 that is internally meshed with the fourth pinion P4 as rotation elements thereof.

In the first, second, third, and fourth planetary gear sets PG1, PG2, PG3, and PG4, one or more rotation elements are connected to each other to operate with eight rotation shafts TM1 to TM8.

The eight rotation shafts TM1 to TM8 will be described in further detail.

The first rotation shaft TM1 includes the first sun gear S1.

The second rotation shaft TM2 includes the first planet carrier PC1, the second ring gear R2, the third planet carrier PC3, and the fourth ring gear R4.

The third rotation shaft TM3 includes the first ring gear R1 and the third ring gear R3.

The fourth rotation shaft TM4 includes the second sun gear S2 and is selectively connected to the transmission housing H.

The fifth rotation shaft TM5 includes the second planet carrier PC2, is selectively connected to the first rotation shaft TM1, is selectively connected to the third rotation shaft TM3, and is directly connected to the input IS so as to be continuously operated as an input element.

The sixth rotation shaft TM6 includes the third sun gear S3.

The seventh rotation shaft TM7 includes the fourth sun gear S4, is selectively connected to the sixth rotation shaft TM6, and is selectively connected to the transmission housing H.

The eighth rotation shaft TM8 includes the fourth planet carrier PC4, is selectively connected to the sixth rotation shaft TM6, and is directly connected to the output gear OG so as to be continuously operated as an output element.

In addition, four clutches C1, C2, C3, and C4 which are friction elements are disposed at connection portions between any two rotation shafts.

In addition, two brakes B1 and B2 which are friction elements are disposed at connection portions between any one rotation shaft and the transmission housing H.

The six friction elements C1 to C4 and B1 to B2 will be described in further detail.

The first clutch C1 is interposed between the first rotation shaft TM1 and the fifth rotation shaft TM5, and selectively connects the first rotation shaft TM1 to the fifth rotation shaft TM5.

The second clutch C2 is interposed between the third rotation shaft TM3 and the fifth rotation shaft TM5, and selectively connects the third rotation shaft TM3 to the fifth rotation shaft TM5.

The third clutch C3 is interposed between the sixth rotation shaft TM6 and the eighth rotation shaft TM8, and selectively connects the sixth rotation shaft TM6 to the eighth rotation shaft TM8.

The fourth clutch C4 is interposed between the sixth rotation shaft TM6 and the seventh rotation shaft TM7, and selectively connects the sixth rotation shaft TM6 to the seventh rotation shaft TM7.

The first brake B1 is interposed between the fourth rotation shaft TM4 and the transmission housing H, and causes the fourth rotation shaft TM4 to be operated as a selective fixed element.

The second brake B2 is interposed between the seventh rotation shaft TM7 and the transmission housing H, and causes the seventh rotation shaft TM7 to be operated as a selective fixed element.

The friction elements including the first, second, third, and fourth clutches C1, C2, C3, and C4 and the first and second brakes B1 and B2 may be multi-plates friction elements of wet type that are operated by hydraulic pressure.

FIG. 2 is an operation chart of friction elements at each speed stage in the planetary gear train according to an exemplary embodiment of the present invention.

As shown in FIG. 2, three friction elements are operated at each speed stage in the planetary gear train according to an exemplary embodiment of the present invention.

The second and fourth clutches C2 and C4 and the second brake B2 are operated at a first forward speed stage 1ST.

The second and third clutches C2 and C3 and the second brake B2 are operated at a second forward speed stage 2ND.

The first and second clutches C1 and C2 and the second brake B2 are operated at a third forward speed stage 3RD.

The first, second and third clutches C1, C2, and C3 are operated at a fourth forward speed stage 4TH.

The first and third clutches C1 and C3 and the second brake B2 are operated at a fifth forward speed stage 5TH.

The first and third clutches C1 and C3 and the first brake B1 are operated at a sixth forward speed stage 6TH.

The first clutch C1 and the first and second brakes B1 and B2 are operated at a seventh forward speed stage 7TH.

The first and fourth clutches C1 and C4 and the first brake B1 are operated at an eighth forward speed stage 8TH.

The third and fourth clutches C3 and C4 and the first brake B1 are operated at a ninth forward speed stage 9TH.

The second and fourth clutches C2 and C4 and the first brake B1 are operated at a tenth forward speed stage 10TH.

The second and third clutches C2 and C3 and the first brake B1 are operated at an eleventh forward speed stage 11TH.

The first and fourth clutches C1 and C4 and the second brake B2 are operated at a reverse speed stage REV.

Shifting processes in the exemplary embodiment of the present invention will be described in further detail.

If the second and fourth clutches C2 and C4 and the second brake B2 are operated at a first forward speed stage 1ST, the third rotation shaft TM3 is connected to the fifth rotation shaft TM5, the sixth rotation shaft TM6 is connected to the seventh rotation shaft TM7, rotation speed of the input shaft IS is input to the fifth rotation shaft TM5, and the seventh rotation shaft TM7 is operated as the fixed element. Therefore, the first forward speed stage is achieved.

If the second and third clutches C2 and C3 and the second brake B2 are operated at a second forward speed stage 2ND, the third rotation shaft TM3 is connected to the fifth rotation shaft TM5, the sixth rotation shaft TM6 is connected to the eighth rotation shaft TM8, rotation speed of the input shaft IS is input to the fifth rotation shaft TM5, and the seventh rotation shaft TM7 is operated as the fixed element. Therefore, the second forward speed stage is achieved.

If the first and second clutches C1 and C2 and the second brake B2 are operated at a third forward speed stage 3RD, the first rotation shaft TM1 is connected to the fifth rotation shaft TM5, the third rotation shaft TM3 is connected to the fifth rotation shaft TM5, rotation speed of the input shaft IS is input to the fifth rotation shaft TM5, and the seventh rotation shaft TM7 is operated as the fixed element. Therefore, the third forward speed stage is achieved.

If the first, second and third clutches C1, C2, and C3 are operated at a fourth forward speed stage 4TH, the first rotation shaft TM1 is connected to the fifth rotation shaft TM5, the third rotation shaft TM3 is connected to the fifth rotation shaft TM5, and the sixth rotation shaft TM6 is connected to the eighth rotation shaft TM8. Therefore, all the planetary gear sets become direct-coupling states. At this state, if rotation speed of the input shaft IS is input to the fifth rotation shaft TM5, the fourth forward speed stage is achieved. At the fourth forward speed stage, rotation speed that is the same as that of the input shaft IS is output.

If the first and third clutches C1 and C3 and the second brake B2 are operated at a fifth forward speed stage 5TH, the first rotation shaft TM1 is connected to the fifth rotation shaft TM5, the sixth rotation shaft TM6 is connected to the eighth rotation shaft TM8, rotation speed of the input shaft IS is input to the fifth rotation shaft TM5, and the seventh rotation shaft TM7 is operated as the fixed element. Therefore, the fifth forward speed stage is achieved.

If the first and third clutches C1 and C3 and the first brake B1 are operated at a sixth forward speed stage 6TH, the first rotation shaft TM1 is connected to the fifth rotation shaft TM5, the sixth rotation shaft TM6 is connected to the eighth rotation shaft TM8, rotation speed of the input shaft IS is input to the fifth rotation shaft TM5, and the fourth rotation shaft TM4 is operated as the fixed element. Therefore, the sixth forward speed stage is achieved.

If the first clutch C1 and the first and second brakes B1 and B2 are operated at a seventh forward speed stage 7TH, the first rotation shaft TM1 is connected to the fifth rotation shaft TM5, rotation speed of the input shaft IS is input to the fifth rotation shaft TM5, and the fourth and seventh rotation shafts TM4 and TM7 are operated as the fixed elements. Therefore, the seventh forward speed stage is achieved.

If the first and fourth clutches C1 and C4 and the first brake B1 are operated at an eighth forward speed stage 8TH, the first rotation shaft TM1 is connected to the fifth rotation shaft TM5, the sixth rotation shaft TM6 is connected to the seventh rotation shaft TM7, rotation speed of the input shaft IS is input to the fifth rotation shaft TM5, and the fourth rotation shaft TM4 is operated as the fixed element. Therefore, the eighth forward speed stage is achieved.

If the third and fourth clutches C3 and C4 and the first brake B1 are operated at a ninth forward speed stage 9TH, the sixth rotation shaft TM6 is connected to the seventh and eighth rotation shafts TM7 and TM8, rotation speed of the input shaft IS is input to the fifth rotation shaft TM5, and the fourth rotation shaft TM4 is operated as the fixed element. Therefore, the ninth forward speed stage is achieved.

If the second and fourth clutches C2 and C4 and the first brake B1 are operated at a tenth forward speed stage 10TH, the third rotation shaft TM3 is connected to the fifth rotation shaft TM5, the sixth rotation shaft TM6 is connected to the seventh rotation shaft TM7, rotation speed of the input shaft IS is input to the fifth rotation shaft TM5, and the fourth rotation shaft TM4 is operated as the fixed element. Therefore, the tenth forward speed stage is achieved.

If the second and third clutches C2 and C3 and the first brake B1 are operated at an eleventh forward speed stage 11TH, the third rotation shaft TM3 is connected to the fifth rotation shaft TM5, the sixth rotation shaft TM6 is connected to the eighth rotation shaft TM8, rotation speed of the input shaft IS is input to the fifth rotation shaft TM5, and the fourth rotation shaft TM4 is operated as the fixed element. Therefore, the eleventh forward speed stage is achieved.

If the first and fourth clutches C1 and C4 and the second brake B2 are operated at a reverse speed stage REV, the first rotation shaft TM1 is connected to the fifth rotation shaft TM5, the sixth rotation shaft TM6 is connected to the seventh rotation shaft TM7, rotation speed of the input shaft IS is input to the fifth rotation shaft TM5, and the seventh rotation shaft TM7 is operated as the fixed element. Therefore, the reverse speed stage is achieved.

The planetary gear train according to an exemplary embodiment of the present invention may achieve eleven forward speed stages and one reverse speed stage by controlling four planetary gear sets PG1, PG2, PG3, and PG4 with four clutches C1, C2, C3, and C4 and two brakes B1 and B2.

Therefore, the planetary gear train according to an exemplary embodiment of the present invention may improve power delivery performance and fuel efficiency.

Since a speed stage suitable to engine speed can be achieved due to multiple speed stages, silent driving may be improved.

In addition, since three friction elements operate at each speed stage and the number of non-operating friction elements is minimized, a friction drag loss may be decreased. Therefore, power delivery efficiency and fuel efficiency may be improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
    an input shaft receiving torque of an engine;
    an output gear outputting changed torque;
    a first planetary gear set including a first sun gear, a first planet carrier, and a first ring gear;
    a second planetary gear set including a second sun gear, a second planet carrier, and a second ring gear;
    a third planetary gear set including a third sun gear, a third planet carrier, and a third ring gear;
    a fourth planetary gear set including a fourth sun gear, a fourth planet carrier, and a fourth ring gear;
    a first rotation shaft including the first sun gear;
    a second rotation shaft including the first planet carrier, the second ring gear, the third planet carrier, and the fourth ring gear;
    a third rotation shaft including the first ring gear and the third ring gear;
    a fourth rotation shaft including the second sun gear and selectively connected to a transmission housing;
    a fifth rotation shaft including the second planet carrier, selectively connected to the first rotation shaft, selectively connected to the third rotation shaft, and directly connected to the input shaft;
    a sixth rotation shaft including the third sun gear;
    a seventh rotation shaft including the fourth sun gear, selectively connected to the sixth rotation shaft, and selectively connected to the transmission housing; and
    an eighth rotation shaft including the fourth planet carrier, selectively connected to the sixth rotation shaft, and directly connected to the output gear.

2. The planetary gear train of claim 1, wherein each of the first, second, third, and fourth planetary gear sets is a single pinion planetary gear set.

3. The planetary gear train of claim 1, wherein the first, second, third, and fourth planetary gear sets are disposed sequentially from an engine side.

4. The planetary gear train of claim 1, further comprising:
    a first clutch disposed between the first rotation shaft and the fifth rotation shaft;
    a second clutch disposed between the third rotation shaft and the fifth rotation shaft;
    a third clutch disposed between the sixth rotation shaft and the eighth rotation shaft;

a fourth clutch disposed between the sixth rotation shaft and the seventh rotation shaft;
a first brake disposed between the fourth rotation shaft and the transmission housing; and
a second brake disposed between the seventh rotation shaft and the transmission housing.

5. The planetary gear train of claim 4, wherein a first forward speed stage is achieved by operation of the second and fourth clutches and the second brake,
a second forward speed stage is achieved by operation of the second and third clutches and the second brake,
a third forward speed stage is achieved by operation of the first and second clutches and the second brake,
a fourth forward speed stage is achieved by operation of the first, second and third clutches,
a fifth forward speed stage is achieved by operation of the first and third clutches and the second brake,
a sixth forward speed stage is achieved by operation of the first and third clutches and the first brake,
a seventh forward speed stage is achieved by operation of the first clutch and the first and second brakes,
an eighth forward speed stage is achieved by operation of the first and fourth clutches and the first brake,
a ninth forward speed stage is achieved by operation of the third and fourth clutches and the first brake,
a tenth forward speed stage is achieved by operation of the second and fourth clutches and the first brake,
an eleventh forward speed stage is achieved by operation of the second and third clutches and the first brake, and
a reverse speed stage is achieved by operation of the first and fourth clutches and the second brake.

6. A planetary gear train of an automatic transmission for a vehicle, comprising:
an input shaft receiving torque of an engine;
an output gear outputting changed torque;
a first planetary gear set including a first sun gear, a first planet carrier, and first ring gear;
a second planetary gear set including a second sun gear, a second planet carrier, and a second ring gear;
a third planetary gear set including a third sun gear, a third planet carrier, and a third ring gear;
a fourth planetary gear set including a fourth sun gear, a fourth planet carrier, and a fourth ring gear;
a first clutch selectively connecting the first sun gear to the second planet carrier;
a second clutch selectively connecting the second planet carrier to the first ring gear;
a third clutch selectively connecting the third sun gear to the fourth planet carrier;
a fourth clutch selectively connecting the third sun gear to the fourth sun gear;
a first brake selectively connecting the second sun gear to the transmission housing;
a second brake selectively connecting the fourth sun gear to the transmission housing;
wherein the input shaft is directly connected to the second planet carrier,
the output gear is directly connected to the fourth planet carrier,
the first planet carrier is directly connected to the second ring gear, the third planet carrier, and the fourth ring gear,
the first ring gear is directly connected to the third ring gear.

7. The planetary gear train of claim 6, wherein each of the first, second, third, and fourth planetary gear sets is a single pinion planetary gear set.

8. The planetary gear train of claim 6, wherein the first, second, third, and fourth planetary gear sets are disposed sequentially from an engine side.

9. The planetary gear train of claim 6, wherein a first forward speed stage is achieved by operation of the second and fourth clutches and the second brake,
a second forward speed stage is achieved by operation of the second and third clutches and the second brake,
a third forward speed stage is achieved by operation of the first and second clutches and the second brake,
a fourth forward speed stage is achieved by operation of the first, second and third clutches,
a fifth forward speed stage is achieved by operation of the first and third clutches and the second brake,
a sixth forward speed stage is achieved by operation of the first and third clutches and the first brake,
a seventh forward speed stage is achieved by operation of the first clutch and the first and second brakes,
an eighth forward speed stage is achieved by operation of the first and fourth clutches and the first brake,
a ninth forward speed stage is achieved by operation of the third and fourth clutches and the first brake,
a tenth forward speed stage is achieved by operation of the second and fourth clutches and the first brake,
an eleventh forward speed stage is achieved by operation of the second and third clutches and the first brake, and
a reverse speed stage is achieved by operation of the first and fourth clutches and the second brake.

* * * * *